US010819255B2

United States Patent
Kalygin et al.

(10) Patent No.: US 10,819,255 B2
(45) Date of Patent: Oct. 27, 2020

(54) STARTING AN INDUCTION MACHINE

(71) Applicant: ABB Schweiz AG, Baden (CH)

(72) Inventors: Andrey Kalygin, Würenlingen (CH); Christian Stulz, Zürich (CH); Christof Gutscher, Zürich (CH); Marc Rauer, Waldshut Tiengen (DE); Mate Jelavic, Zürich (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/238,049

(22) Filed: Jan. 2, 2019

(65) Prior Publication Data

US 2019/0140563 A1  May 9, 2019

Related U.S. Application Data

(63) Continuation of application No. PCT/EP2017/065896, filed on Jun. 27, 2017.

(30) Foreign Application Priority Data

Jul. 1, 2016 (EP) .................................... 16177547

(51) Int. Cl.
| | | |
|---|---|---|
| *H02P 1/46* | (2006.01) | |
| *H02P 21/20* | (2016.01) | |
| *H02P 21/34* | (2016.01) | |
| *H02P 1/02* | (2006.01) | |
| *H02P 1/26* | (2006.01) | |
| *H02P 21/12* | (2016.01) | |

(52) U.S. Cl.
CPC .................. *H02P 1/46* (2013.01); *H02P 1/02* (2013.01); *H02P 1/26* (2013.01); *H02P 21/12* (2013.01); *H02P 21/20* (2016.02); *H02P 21/34* (2016.02)

(58) Field of Classification Search
CPC .. H02P 1/46; H02P 21/20; H02P 21/34; H02P 1/02; H02P 1/26; H02P 21/12
USPC ........................................................ 318/700
See application file for complete search history.

(56) References Cited

U.S. PATENT DOCUMENTS

| | | |
|---|---|---|
| 5,461,296 A | 10/1995 | Messersmith et al. |
| 5,654,624 A | 8/1997 | Schroderus |
| 2009/0079374 A1* | 3/2009 | De Four ................. H02P 6/182 318/400.34 |

(Continued)

FOREIGN PATENT DOCUMENTS

JP      2000253505 A      9/2000

OTHER PUBLICATIONS

European Patent Office, International Search Report & Written Opinion issued in corresponding Application No. PCT/EP2017/065896, dated Sep. 20, 2017, 10 pp.

(Continued)

*Primary Examiner* — Kawing Chan
(74) *Attorney, Agent, or Firm* — Taft Stettinius & Hollister LLP; J. Bruce Shelkopf

(57) ABSTRACT

A method for starting an induction machine without residual flux includes: scanning a state of the induction machine with different stator frequencies by controlling a supply voltage applied to the induction machine; determining whether a slip value, being a difference between a rotor frequency and a stator frequency, is within a slip interval; and, when it has been determined that the slip value is in the slip interval, regulating the slip value towards zero and magnetising the machine to the required level.

9 Claims, 3 Drawing Sheets

(56) References Cited

U.S. PATENT DOCUMENTS

| | | | |
|---|---|---|---|
| 2011/0162554 A1* | 7/2011 | Galic | H02P 21/0089 |
| | | | 105/49 |
| 2012/0001580 A1 | 1/2012 | Zhang et al. | |
| 2012/0098472 A1 | 4/2012 | Wrobel et al. | |
| 2015/0200616 A1 | 7/2015 | Saeki et al. | |
| 2018/0351497 A1* | 12/2018 | Osman | H02P 21/00 |

OTHER PUBLICATIONS

Mckinnon et al., "Influence of Rotor Residual Flux on the Measurement of Inductance and its Possible Use as an Impending Fault Indicator," Jun. 5, 2007, Retrieved from the Internet: http://www.pdma.com/pdfs/Articles/Influence_of_Residual_Flux_on_the_Measurement_of_Inductance.pdf.

* cited by examiner

STARTING AN INDUCTION MACHINE

FIELD OF THE INVENTION

The invention relates to the field of electric drives and induction machines. In particular, the invention relates to a method and controller for starting an induction machine without residual flux. Furthermore, the invention relates to an electric drive system.

BACKGROUND OF THE INVENTION

An electrical drive system usually comprises a converter for supplying an induction machine, such as an electrical motor and/or generator, with electrical energy. By applying an AC current to the induction machine, in a stator and a rotor of the induction machine magnetic fields are generated, which causes the rotor to rotate with respect to the stator.

During a startup of the electrical drive, there may be the problem that the actual rotation speed of the rotor is not known. This may be the case, when an electrical motor has lost power supply for a short time and might still be rotating, or when a generator is already driven by a turbine but not yet producing electrical energy. However, usually it is necessary to know the rotor speed for controlling the induction machine.

There are two basic solutions for this problem. The motor speed may be measured directly with a mechanical sensor or the motor speed may be determined indirectly via measurements of currents and/or voltages in the electrical drive system.

For example, US 2015/0200616 A1 proposes a method, with which the motor speed during startup may be estimated based on current and voltage measurements.

As a further example, in U.S. Pat. No. 5,654,624 it is proposed to identify the rotor speed with an estimator of asynchronous machine states. The method applies voltage to the induction machine. Then, based on measured currents, the estimator calculates stator flux, rotor flux and torque. The estimated torque is provided to a torque controller that operates with zero reference. The controller regulates torque to zero by making stator and rotor flux co-phasal, thus synchronizing the frequency of the supply voltage with a rotor speed. The method described in U.S. Pat. No. 5,654,624 may not work well at high initial slip, i.e. high difference between stator frequency and rotor frequency, because in this case, rotor flux and machine torque are close to zero and are comparable with measurement and estimation errors.

Further, from US 2012/0001580 A1 a system and a method for detecting a rotor fault condition in an AC induction machine is known.

DESCRIPTION OF THE INVENTION

It is an objective of the invention to provide a simple and more accurate method for starting an induction machine without a mechanical speed sensor, in particular, when the rotor of the induction machine may be rotating.

This objective is achieved by the subject-matter of the independent claims. Further exemplary embodiments are evident from the dependent claims and the following description.

An aspect of the invention relates to a method for starting an induction machine, in particular without residual flux. The induction machine may comprise a stator and a rotor. The induction machine may be part of an electrical drive system, which comprises the induction machine, an electrical converter and a controller, which is adapted for performing the method. The controller may control the converter, which may be adapted for converting an input voltage, for example from a grid or from a DC link, into an AC supply voltage of variable frequency to be applied to the induction machine. By controlling the frequency and the magnitude of the supply voltage, the controller may control the torque applied from the stator to the rotor (or vice versa).

It has to be noted that the input voltage, supply voltage, the corresponding currents and voltages, currents, and fluxes in the induction machine may be multi-component quantities, which usually may have three components.

According to an embodiment of the invention, the method comprises: scanning a state of the induction machine with different stator frequencies by controlling a supply voltage applied to the induction machine; determining whether a slip value, being a difference between a rotor frequency and the stator frequency, is within a slip interval; and, when it has been determined that the slip value is in the slip interval, regulating the slip value towards zero.

The method may be used during starting of the induction machine, when it is rotating with unknown rotor speed or standing still. The method searches for a stator frequency range, which may be seen as the state to be scanned, where the slip value lies within in a slip interval, which borders may be defined by the critical motoring slip value and the critical generating slip value. When it has been determined that the stator frequency is such that the slip value has entered the slip interval, the slip value is regulated to about zero, such that in the end the stator frequency and the rotor frequency are substantially the same. Then, the induction machine may be magnetized to a desired level and/or normal operation of the induction machine may be started.

The stator frequency may refer to a frequency of the supply voltage applied to the stator and/or the frequency of the stator flux, which may be generated by this voltage. The rotor frequency may refer to the rotor mechanical rotational speed multiplied by a number of stator pole pairs. It has to be noted that only the stator frequency may be controlled directly by the controller, since usually only the stator is supplied with the supply voltage. The speed of the rotor, i.e. the speed at which the rotor is rotating multiplied by a number of stator pole pairs, may be equal to the rotor frequency.

During the scanning, the stator frequency may be controlled with open loop control. For example, the controller may start at maximal or minimal stator frequency and may decrease or increase the stator frequency until it is determined that the slip interval has been entered. The supply voltage is generated based on the stator frequency without closed loop control. For example, no torque reference or reference of a torque related quantity is provided and/or no error of the torque or the torque related quantity is corrected.

The determination, whether the slip value is within the slip interval, may be done indirectly, i.e. it is not necessary that the value of the slip value is determined. As will be described below in more detail, the slip and/or its derivative may correlate to other electric quantities, which may be measured in the electric drive and/or which may be estimated and/or determined from these quantities.

As soon as it is identified that the slip value is within the interval between the critical slips, the method may stop scanning and may enable a controller which regulates the slip value substantially to zero.

When the slip interval has been entered, the controller is switched to closed loop control. The slip value is then regulated towards zero. Here and in the following, the term "regulating" may refer to a closed loop control of the corresponding quantity. The slip value may not be directly regulated towards zero, but a torque relating quantity, which is positively correlated with the slip value within the interval between the critical slips, may be regulated towards zero. Positively correlated may mean that the torque related quantity is coupled with a positive possibly non-constant coefficient with the slip value, so that torque is raising (or falling), when the slip is increased (or decreased). Regulating towards zero may mean that an absolute value of the slip value is decreasing due to the regulation. Regulating to zero may mean that the slip value (or the corresponding torque related quantity) is substantially zero in the end, which may mean that the absolute value of the slip value (or the corresponding torque related quantity) is fallen below a threshold value.

When the slip value (or the corresponding torque related quantity) has fallen below the threshold value, normal operation of the electrical drive may be started, since now rotor frequency and the stator frequency are synchronized.

According to an embodiment of the invention, the slip interval is defined between two critical slip values at which an electromagnetic torque of the induction machine is minimal or maximal. The borders of the slip interval may be defined by these critical values. When the electromagnetic torque is minimal (i.e. maximal negative), this may be the critical value, where the induction machine is in generator mode. When the electromagnetic torque is maximal, this may be the critical value, where the induction machine is in motor mode.

Between the two critical slip values, a decreasing torque or torque related quantity indicates that also the slip value is decreasing. This may be used for regulating the slip value to zero.

The event or moment when the slip value has entered the interval within the critical slip values, may be determined using different criteria. In particular, it may be determined indirectly without determining the slip value. The different ways, whether the slip value is within a slip interval, may be combined with each other.

According to the invention, the method further comprises: during the scanning, determining a torque related quantity from measurements and/or estimations in the induction machine, wherein the torque related quantity is positively correlated with an electromagnetic torque of the induction machine; and determining whether the slip value is within the slip interval based on the torque related quantity. For example, the torque related quantity is the electromagnetic torque and/or a torque producing component of a stator current, a rotor current, a stator flux, a rotor flux, a main flux, etc.

A torque producing component of a multi-component quantity may be determined by transforming the quantity into the rotating orthogonal DQ-coordinate frame and aligning the D-axis of the coordinate frame with the stator flux vector.

In general, the method may identify the entering of the slip interval based on an analysis of a change of one or more accessory quantities derived from measured or estimated states of the induction machine.

The torque related and/or torque producing quantity may be a quantity that may be determined from measurements and/or estimation in the electric drive and that is positively correlated with the torque. Positively correlated may mean that the torque and the torque related quantity are coupled by a positive possibly non-constant coefficient, so that the torque is raising (or falling), when the torque related quantity is increased (or decreased) and vice versa. The torque related quantity may be directly proportional to the torque, which may be a linear dependence.

Since the torque related quantity is positively correlated with the electromagnetic torque, it also positively correlated with the slip value within the interval between the critical slips. Thus, a slope, i.e. differential, a maximum and/or a minimum of the torque related quantity with respect to the stator frequency, which is scanned, may be determined. From the slope, maximum and/or minimum, the entering of the slip interval may be determined.

According to an embodiment of the invention, the method further comprises: determining a derivative of the torque related quantity with respect to the stator frequency; and determining whether the slip value is within the slip interval, when the derivative is higher than a threshold value. For example, the event of entering the slip interval may be identified when the derivative is higher than a threshold. The derivative may be a discrete derivate. For example, when during the scanning it is switched from a previous stator frequency to a next stator frequency, the derivative may be the difference of the torque related quantity at the previous frequency and the next frequency.

Since outside of the slip interval the torque related quantity may have a negative derivative and inside of the slip interval the torque related quantity may have a positive derivative, the entering of the slip interval may be detected, when the derivative becomes positive and/or higher than a threshold.

According to an embodiment of the invention, the method further comprises: determining a maximal absolute value of the torque related quantity; and determining whether the slip value is within the slip interval, when the absolute value of torque related quantity becomes smaller than the maximal absolute value. When the slip interval is bordered by critical values at which a minimum and a maximum of the torque related quantity is reached, the entering of the slip interval may be detected by detecting that the torque related quantity has passed an extremal value, i.e. a maximal absolute value. For example, during the scan, an actual maximal absolute value of the torque related quantity may be calculated, when the absolute value of torque related quantities become smaller than this absolute maximal value, the extremum has been reached and thus, the slip interval has been entered. A difference and/or a ratio between the absolute maximal value and the actual torque related quantity during the scan may be calculated. The entering of the slip interval may be detected, when the difference becomes smaller than a negative threshold value and/or when the ratio falls below a threshold value (which may be a bit smaller than 1, such as 0.9).

For example, if scanning begins from a stator frequency which is higher than the rotor frequency, a maximal value of the torque related quantity may be determined. In this case, the entering of the slip interval may be identified, when the torque related quantity becomes smaller than the determined maximal value, for example by a coefficient k, which may be between 0 and 1.

On the other hand, if scanning begins from a stator frequency which is lower than the rotor frequency, a minimal value of the torque related quantity may be determined. The entering of the slip interval may be identified, when a negative value of the torque related quantity becomes greater than the determined negative value of the minimal value, for example by a coefficient k, which may be between 0 and 1.

According to an embodiment of the invention, the method further comprises: determining whether the slip value is within the slip interval, when a magnitude of an actual stator current becomes smaller than a magnitude of a short circuit stator current corresponding to a stator flux magnitude used for scanning of the induction machine.

Within the slip interval, the magnitude of the stator current may be smaller than a threshold value and outside of the slip interval, the magnitude of the stator current may be greater than this threshold value. Entering the slip interval may be identified, when the magnitude of the stator current falls below the threshold. This threshold may depend on or may be the magnitude of short circuit stator current corresponding to the stator flux magnitude applied during scanning. The entering of the slip interval may be identified, when the stator current magnitude becomes smaller than the magnitude of the short circuit stator current, for example by a coefficient k, which may be between 0 and 1.

According to an embodiment of the invention, the method further comprises: determining whether the slip value is within the slip interval, when a component of an actual stator current becomes smaller than a magnitude of a short circuit stator current corresponding to the scanning stator flux magnitude. The component of the actual stator current may be the magnetizing component of the stator current in the DQ coordinate frame, which has been aligned with the stator flux as described above. Entering the slip interval may be identified, when the component of the stator current falls below a threshold. This threshold may depend on or may be the magnitude of short circuit stator current corresponding to the stator flux applied during scanning. The entering of the slip interval may be identified, when the stator current component becomes smaller than the magnitude of the short circuit stator current, for example by a coefficient k, which may be between 0 and 1.

According to an embodiment of the invention, the scanning starts with a maximal or minimal frequency, which is decreased or increased during scanning. In general, the scanning may be performed form higher stator frequencies down to lower frequencies or vice versa. The scanning may be performed in equal distanced steps of the stator frequency. The maximal frequency or minimal frequency may be determined by physical constraints of the drive system.

According to the invention, the slip value is regulated to zero by regulating a torque related quantity to zero. For example, the torque related quantity may be the torque itself or a torque producing current component of the stator current in the DQ coordinate frame. For example, a direct torque controller or a controller of torque producing quantity or any other slip dependent quantity may be used. For example, a torque reference or reference value of the torque related quantity may be set to zero for the regulation.

It has to be noted that during scanning, no regulation of the slip value, i.e. no regulation of torque, may be performed. For example, an error value of the torque related quantity used by the controller may be set to zero.

According to an embodiment of the invention, the scanning is performed with a scanning stator flux magnitude lower than a nominal stator flux magnitude used during normal operation of the induction machine. During scanning, the stator flux magnitude may be reduced, for lowering the energy in the induction machine.

According to an embodiment of the invention, during regulating the slip value to zero, the stator flux magnitude may be controlled to a desired value corresponding to an operating point of the induction machine. When the slip value is regulated to zero, the stator flux magnitude may be increased to the desired value of the stator flux magnitude.

When the stator flux magnitude has reached the value, the controller may be switched to normal operation.

A further aspect of the invention relates to a controller for an induction machine, which is adapted for performing the method as described in the above and in the following. For example, the method may be implemented in an FPGA or microprocessor. It has to be noted that the part of the controller regulating the torque related quantity may be the same part, which is used for controlling the induction machine during normal operation. It may only be necessary to implement the scanning and to use already present parts of the controller for controlling the induction machine during startup. Thus, for implementing the method, only a small part of the controller has to be modified.

A further aspect of the invention relates to an electrical drive system, which comprises an induction machine, an electrical converter and such a controller. The method may be implemented in the electrical drive system without any further mechanical and/or electrical components. Since no speed sensor is needed, only the controller may have to be modified.

It has to be understood that features of the method as described in the above and in the following may be features of the controller and/or the drive system as described in the above and in the following, and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
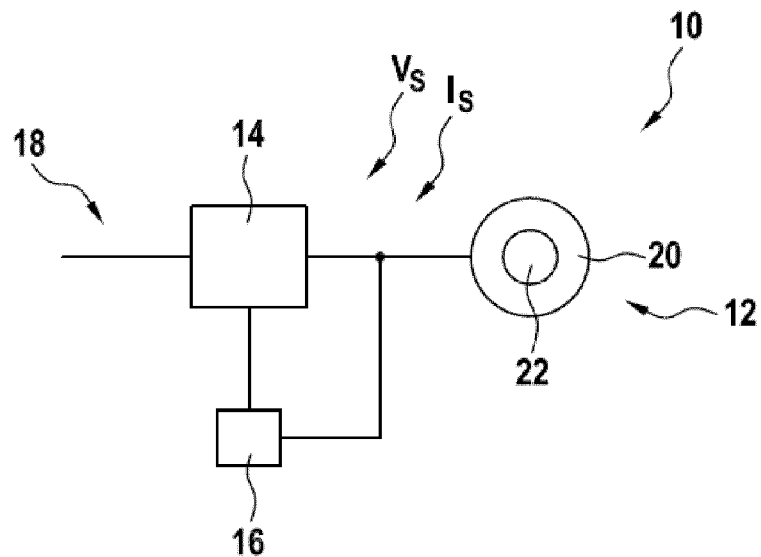
FIG. 1 schematically shows a drive system according to an embodiment of the invention.

FIG. 1 schematically shows a drive system 10 comprising an induction machine 12, a converter 14 and a controller 16.

The converter 14 may be connected with an AC or DC source 18, such as an electrical grid or DC link, and may generate a supply current i with supply voltage v, which are applied to the stator 20 of the induction machine 12, which may generate electromagnetic fields that drive a rotor 22 of the induction machine 12. In such a way, the induction machine 12 may be operated in a motor mode, in which electrical energy is transferred from stator 20 to mechanical energy of the rotor 22 of the induction machine 12. On the other hand, the induction machine 12 may be operated in a generator mode, in which the rotor 22 is driven by a turbine or other means and mechanical energy from the rotor 22 is transferred to the stator 20 of the induction machine 12 and to the source 18.

For example, the converter 14 may be a three-level or multi-level converter based on half-bridges, which may comprise semiconductor switches controlled by the controller 16. The converter 14 also may be a direct converter.

The operation of the induction machine 12 is controlled by the controller 16, which receives measurement values of the supply voltage current $V_s$ and supply current $I_s$, which usually are equal to the stator voltage and the stator current. The controller 16 determines from the supply voltage $V_s$ and supply current $I_s$ further quantities of the induction machine 12, and based on these quantities controls the induction machine 12. For example, the controller 16 may comprise a direct torque controller or a current controller.

It has to be noted that the supply voltage $V_s$ and the supply current $I_s$ may be multi-component quantities, i.e. vectors. When the drive system 10 is a three phase system, the measured supply voltage $V_s$ and the measured supply current $I_s$ comprise three components.

During the startup phase of the drive system 10, i.e. when the converter 14 starts to work, there may be the problem, that the controller 16 does not know the rotation speed of the rotor 22. This may be the case, when, for example, the induction machine 12 is a motor, which has lost power supply only a short time ago and the rotor 22 is still rotating. In this case, which may be called flying start, the controller 16 may not be able to correctly calculate specific quantities used for controlling the converter 14 and the induction machine 12.

In the following, a method will be described, how the controller 16 can estimate the rotor speed without the use of a mechanical speed sensor. When performing the method, it is possible that the induction machine 12 is rotating with unknown speed or is standing still. Furthermore, the method is applicable for starting the induction machine 12 without a residual flux.

The flying start method is based on the dependencies of the characteristics of the induction machine 12 from slip $\beta$. The slip $\beta$ may be defined as the difference between the rotor frequency $\omega_r$ and the stator frequency $\omega_s$.

The rotor frequency $\omega_r$ may be the mechanical rotational speed of the rotor 22 multiplied by a number of stator pole pairs. The rotor mechanical rotational speed may be the speed with which the rotor 22 is rotating with respect to the stator 20. At the beginning of the method, the controller 16 does not know the rotor frequency $\omega_r$ and the slip $\beta$.

The stator frequency $\omega_s$ may be the frequency of the stator flux $\Psi_s$ of the stator 22 and/or of the stator current $I_s$ flowing in the rotor 22. The stator current $I_s$ may be controlled by the controller 16 and measurement values for the stator current $I_s$ may be received continuously by the controller 16. Therefore, the stator current $I_s$ and the stator flux $\Psi_s$ which is derivable from the stator voltage $V_s$ and the stator current $I_s$, are known to the controller 16.

Figure 2:
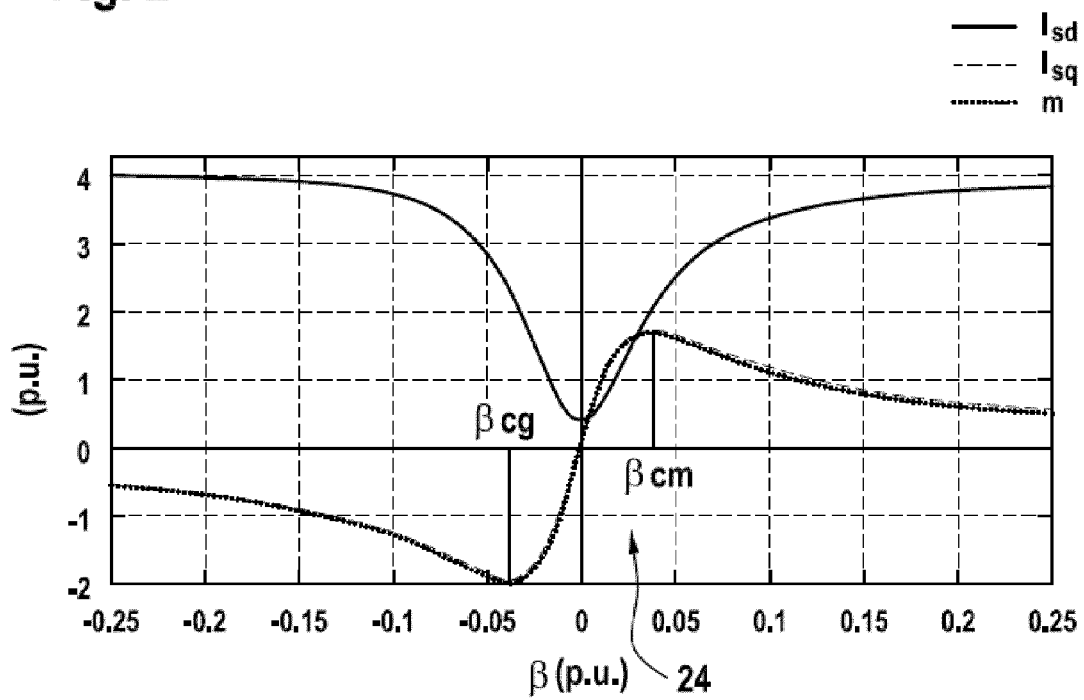
FIG. 2 shows a diagram indicating the dependence of torque with respect to slip.

FIG. 2 shows the dependency of the stator current $$I_s = \begin{bmatrix} i_{sd} \\ i_{sq} \end{bmatrix}$$

(with components in the DQ coordinate frame) and the electromagnetic torque m with respect to the slip $\beta$, in case of a nominal stator flux magnitude $\Psi_{sm}$ and a nominal stator frequency $\omega_s$. It has to be noted that the curve shapes stay substantially the same for a wide range of stator frequency and stator flux magnitude combination. FIG. 2 shows the quantities in normalized units (p.u.). In the example of FIG. 2: the stator frequency is $\omega_s=0.5$; the stator flux magnitude is $\Psi_{sm}=1$, and the slip $\beta$ is variable.

In FIG. 2, the current components $i_{sd}$ and $i_{sq}$ of the stator current $I_s$ were calculated in the DQ coordinate frame rotating with the stator frequency $\omega_s$. In particular, the controller 16 may measure the stator current $I_s$ in three components and may determine the current components in the DQ coordinate frame. Furthermore, the controller 16 may then estimate the stator flux also in the DQ coordinate frame $$\Psi_s = \begin{bmatrix} \Psi_{sd} \\ \Psi_{sq} \end{bmatrix}.$$

The DQ coordinate frame may be aligned with the stator flux $\Psi_s$, vector so that $$\psi_{sd}=\Psi_{sm},\psi_{sq}=0, \quad (1)$$

where $\Psi_{sm}$ is the stator flux magnitude, i.e. the length of the stator flux vector. The torque m and the stator current $I_s$ are coupled by:

$$m=\psi_{sd}i_{sq}-\psi_{sq}i_{sd} \quad (2)$$

The DQ coordinate frame orientation condition (1) results in a proportional dependency $$m=\psi_{sd}i_{sq}. \quad (3)$$

Thus, the components of the stator current $I_s$ become a torque producing/torque related current component $i_{sq}$ and a magnetizing current component $i_{sd}$.

The curves of the electromagnetic torque m and torque related current component $i_{sq}$ can be split into three parts. The first one lies between two critical slip values $\beta_c$, and $\beta_{cm}$. $\beta_{cm}$ corresponds to the motor mode of the induction machine 12, $\beta_{cg}$ corresponds to the generator mode of the induction machine 12. Here, $i_{sq}$ and m are raising from maximum generating value to maximum motoring. The corresponding two torque values are also called pull-out torques. The second part is between $-\infty$ and $\beta_{cg}$, the third one between $\beta_{cm}$ and $+\infty$.

Between the two critical slip values $\beta_{cg}$ and $\beta_{cm}$, the torque m and torque related current component $i_{sq}$ is increasing, while outside of this interval between two critical slip values $\beta_{cg}$ and $\beta_{cm}$, the torque m and torque related current component $i_{sq}$ is decreasing. Thus, inside the slip interval 24, defined between the two critical slip values $\beta_{cg}$ and $\beta_{cm}$, the slip and the torque m are coupled by a positive possibly non-constant coefficient, so that the torque is raising (or falling), when the torque related quantity is increased (or decreased). Thus, when the torque m or a torque related quantity, such as the torque related current component $i_{sq}$, are regulated towards zero, the slip $\beta$ also is regulated to zero.

However, this regulation should be performed, when the actual value of the slip $\beta$ is already inside the slip interval 24. This may be determined by the controller 16 based on the form of curves of the torque m and/or a torque related quantity, such as the torque related current component $i_{sq}$.

In particular, the controller 16 may scan a range of rotor frequencies $\omega_r$ by changing the stator frequency $\omega_s$. During scanning, it is determined, when the stator frequency $\omega_s$ appears within the slip interval $$\omega_r+\beta_{cg}<\omega_s<\omega_r+\beta_{cm} \quad (4)$$

Then, the controller 16 may regulate the slip $\beta$ to zero directly or indirectly. For example, this may be performed with a subcontroller that is a torque or an $i_{sq}$-current controller, which may be supplied with a zero reference. No additional control loop for the controller 16 is required. A torque or $i_{sq}$-current subcontroller already used by the controller 16 during normal operation (i.e. after startup and before shutdown) of the drive system 10 may be used.

For example, within the slip interval 24 and only there, the following conditions are true:

$$\frac{di_{sq}}{d\beta} > 0 \quad (5)$$

and $$\frac{dm}{d\beta} > 0. \quad (6)$$

For example, if torque control is based on a current control with flux orientation, then condition (5) may be used. In the case of a direct torque control, the condition (6) may be used.

During scanning, the change of $\omega_r$ may be assumed to be comparatively slow, thus the assumption $\omega_r$=const is acceptable. Then the following relation can be used:

$$d\beta = d\omega_s. \quad (7)$$

When the scanning starts outside of the slip interval 24, which is the case, when the controller 16 starts at a maximal or minimal possible stator frequency, the fractions (5) and/or (6), which may be determined by the controller as discrete derivatives, turn from negative to positive, thus entering the slip interval 24 may be detected, by comparing the corresponding fraction (5) and/or (6) with a positive threshold ε>0, which may provide noise immunity.

For example, in case of a flux oriented control using current control loops, during scanning, the $i_{sq}$-current subcontroller may be disabled. The subcontroller may be enabled again with zero reference when the condition $$\frac{di_{sq}}{d\omega_s} > \varepsilon \quad (8)$$

becomes true, i.e. when the entering of the slip interval 24 is detected.

In case of direct torque control, during scanning, the subcontroller may work in scalar mode. The stator frequency $\omega_s$ (for example via the stator flux angle reference) may be forced by a generator. The torque control loop of the subcontroller may be fed by a virtual estimated torque and a zero torque reference.

When the condition $$\frac{dm}{d\omega_s} > \varepsilon \quad (9)$$

becomes true, the torque control loop feedback may be switched to an estimate of the actual machine torque.

The conditions (8) and (9) may not give ideal rotor frequency detection with β=0 but may be used to enable a torque or $i_{sq}$-current controller, when it can operate normally and regulate the slip value β to zero.

Figure 3A:
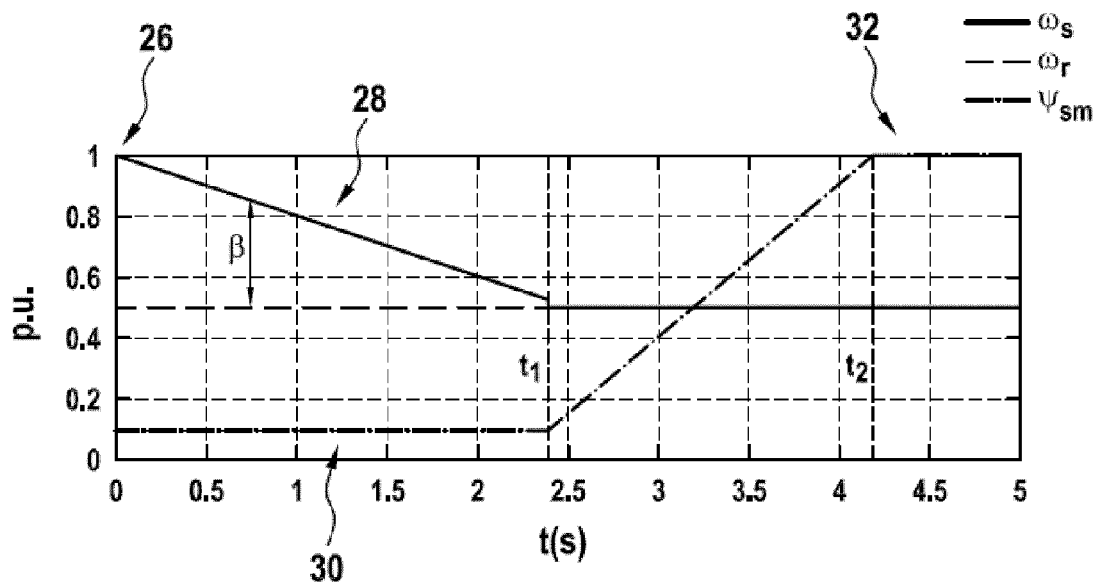
FIG. 3A, 3B, 3C show diagrams with electromagnetic quantities of an induction machine, which are generated during performing the method according to an embodiment of the invention.
Figure 3B:
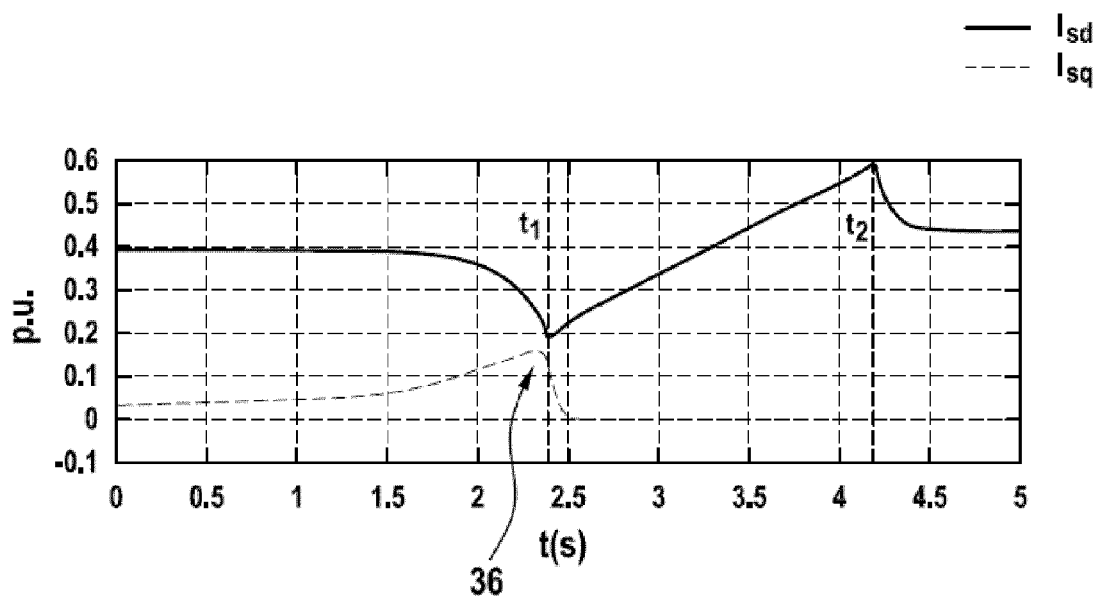

FIG. 3A to 3B show diagrams, in which electromagnetic quantities of the induction machine 12 are depicted over time t, during which the startup method is performed. The method will be explained with respect to these diagrams.

In a first step, between time t=D to time t=$t_1$, the controller 16 scans a state of the induction machine 12 with different stator frequencies $\omega_s$ by controlling the supply voltage $V_s$ applied to the induction machine 12, which is generated by the converter 14.

For example, the scanning may start with a maximal or minimal frequency 26 (in FIG. 3A normalized to 1), which is decreased or increased during scanning. Furthermore, the scanning frequency 28 may be linearly increased or decreased during the scanning. This may be done by the controller 16 by regularly increasing or decreasing the scanning frequency 28.

During the first step, i.e. during scanning, the controller furthermore determines whether the slip value β, being the difference between the rotor speed multiplied by a number of stator pole pairs $\omega_r$ and the actual stator frequency $\omega_s$ set for scanning, is within the slip interval 24. As can be seen from FIG. 3A, the slip value β, when entering the slip interval 24, is rather small compared to the slip value at the maximal or minimal frequency 26.

Furthermore, the scanning may be performed with a scanning stator flux magnitude $\Psi_{sm}$, 30 lower than a desired value 32 for the stator flux magnitude $\Psi_{sm}$ used during normal operation of the induction machine 12. For example, the scanning stator flux magnitude 30 may be about 10% or less of the desired value 32 for the stator flux magnitude corresponding to the operating point of the induction machine.

There are several possibilities, how it may be determined, whether the slip value β has entered the slip interval 24.

Figure 3C:
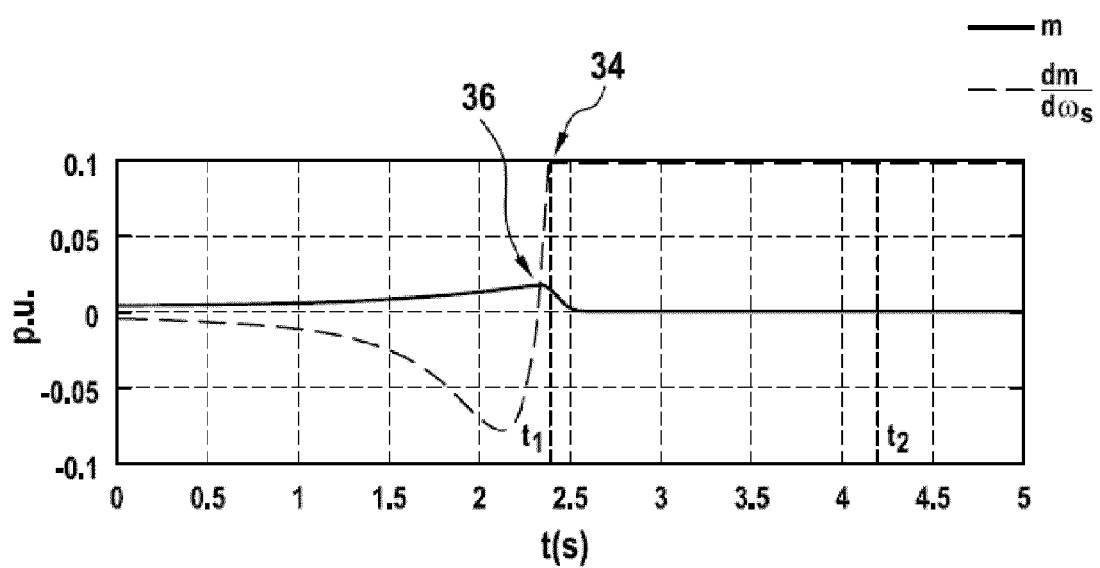

From FIG. 3B, one can see that the torque producing current $i_{sq}$ has passed a maximum, which is an indicator for the slip value β entering the slip interval 24. For example, this may be determined by a derivative of the current $i_{sq}$ and comparing it with a positive threshold value. As shown in FIG. 3C, the same is true for the electromagnetic torque m, and in the example, the controller 16 determines the entering of the slip interval 24, by comparing the derivative of the electromagnetic torque m with respect to the actual scanning stator frequency $\omega_s$, 28 with a threshold value 34 of, for example, 0.1.

In general, only a quantity that is positively correlated to the electromagnetic torque m, such as the torque producing current $i_{sq}$, has to be investigated for reaching an extremum.

Thus, in general, during the scanning, the controller 16 determines a torque related quantity m, $i_{sq}$ from measurements in the induction machine 12, wherein the torque related quantity m, $i_{sq}$ is positively correlated to an electromagnetic torque m of the induction machine 12, and determines, whether the slip value β is within the slip interval 24 based on the torque related quantity m,$i_{sq}$.

As shown in FIG. 3C, the controller 16 may determine a derivative of the torque related quantity m, $i_{sq}$ with respect to the stator frequency $\omega_s$ and may determine whether the slip value β is within the slip interval 24, when the derivative is higher than a threshold value 34.

In general, the criteria (8) and (9) above are not the only options for detection of the slip value β entering the slip interval 24, i.e. condition (5). For example, using a peak detector for torque m or current $i_{sq}$, or in general a torque related quantity, one can substitute (8) and (9) correspondingly by:

$$|i_{sq}| < ki_{sq\,peak}. \quad (10)$$

and $$|m| < km_{peak} \quad (11)$$

Here, $m_{peak}$, $i_{sq\,peak}$ are the respective absolute maximum values 36 of torque m and current $i_{sq}$, which are detected during scanning. k is a margin parameter or factor, 1>k>0, which is multiplied with the absolute maximum value 36 and/or under which the torque related quantity has to fall relative to the absolute maximum value 36 for detecting the slip value β entering the slip interval 24.

In general, the controller 16 may determine a maximal absolute value 36 of the torque related quantity m, $i_{sq}$ and may determine whether the slip value β is within the slip interval 24, when the absolute value of the torque related quantity m, $i_{sq}$ becomes again smaller than the maximal absolute value 36.

A further criterion for detecting that the slip value β enters the slip interval 24 may be based on a stator current magnitude:

$$I_{sm} < kI_{sc\,m},\qquad(12)$$

where $I_{sm}$ is the stator current magnitude and $I_{sc\,m}$ is a magnitude of a stator short circuit current corresponding to the scanning stator flux magnitude $\Psi_{sm}$, 30. The stator short circuit current magnitude $I_{sc\,m}$ may be calculated or measured by the controller 16.

Summarized, the controller 16 may determine whether the slip value β is within the slip interval 24, when a magnitude of an actual stator current becomes smaller than a magnitude of a short circuit stator current.

It is also possible to use the magnetizing current component $i_{sd}$ instead of the stator current magnitude $I_{sm}$ in (12) by $$i_{sd} < kI_{sc\,m}.\qquad(13)$$

The controller 16 may determine whether the slip value β is within the slip interval 24, when a component $i_{sd}$ of an actual stator current becomes smaller than a magnitude of a short circuit stator current corresponding to the scanning stator flux magnitude $\omega_{sm}$, 30 by the factor 1>k>0.

In a second step, after the time $t_1$, when it has been determined that the slip value β is in the slip interval 24, the controller 16 regulates the slip value β towards zero. This may be performed by regulating the torque m or the torque related quantity to zero, for example the same torque related quantity $i_{sq}$, which has been used for detecting the slip value β entering the slip interval 24.

Furthermore, during the second step, the stator flux magnitude $\Psi_{sm}$, may be controlled to a desired value corresponding to the operating point of the induction machine 12.

For example, with reference to FIGS. 3A and 3C, at the time $t_1$, when the torque derivative reaches the threshold value 34 of 0.1, an $i_{sq}$-current controller with zero reference may be enabled and the stator flux magnitude $\Psi_{sm}$ is ramped up to the nominal value of 1.0. At $t_2$, the induction machine 12 is magnetized and the drive system 10 is ready for normal operation.

After the induction machine 12 is magnetized, the flying start method may be finished.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS

10 drive system
12 induction machine
14 converter
16 controller
18 source
20 stator
22 rotor
$V_s$ supply/stator voltage
$I_s$ supply/stator current
$i_{sd}$ magnetizing current component
$i_{sq}$ torque producing/related current component
m electromagnetic torque
β slip/slip value
$β_{cg}$ critical slip value in generator mode
$β_{cm}$ critical slip value in motor mode
24 slip interval
$\omega_s$ stator frequency
$\omega_r$ rotor frequency
$\Psi_{sm}$ stator flux magnitude
26 minimal/maximal frequency
28 scanning frequency
30 scanning stator flux magnitude
32 desired value for stator flux magnitude
34 threshold value
36 maximal absolute value

The invention claimed is:

1. A method for starting an induction machine (12), the method comprising:
   scanning a state of the induction machine with different stator frequencies ($\omega_s$) by controlling a supply voltage ($V_s$) applied to the induction machine;
   during the scanning, determining a torque related quantity (m, $i_{sq}$) from measurements in the induction machine, wherein the torque related quantity (m, $i_{sq}$) is positively correlated with an electromagnetic torque (m) of the induction machine, so that the torque (m) is raising or falling, when the torque related quantity is increased or decreased, respectively;
   determining whether a slip value (b), being a difference between a rotor frequency ($\omega_r$) and a stator frequency ($\omega_s$), is within a slip interval based on the torque related quantity (m, $i_{sq}$); and
   when it has been determined that the slip value (b) is in the slip interval, regulating the slip value (b) towards zero, wherein the slip value (b) is regulated to zero by regulating a torque related quantity (m, $i_{sq}$) to zero;
   wherein it is determined, whether the slip value (b) is within the slip interval, when at least one of:
     a derivative of the torque related quantity (m, $i_{sq}$) with respect to the stator frequency ($\omega_s$) is higher than a threshold value;
     the torque related quantity (m, $i_{sq}$) becomes smaller than a maximal absolute value of the torque related quantity (m, $i_{sq}$);
     a magnitude of an actual stator current becomes smaller than a magnitude of a short circuit stator current corresponding to a stator flux magnitude ($\Psi_{sm}$) used for scanning of the induction machine;

a magnetising component ($i_{sd}$) of an actual stator current becomes smaller than a magnitude of a short circuit stator current corresponding to a stator flux magnitude ($\Psi_{sm}$) used for scanning of the induction machine.

2. The method of claim 1,
wherein the slip interval is defined by two critical slip values ($b_{cg}$, $b_{cm}$) at which an electromagnetic torque (m) of the induction machine is minimal or maximal.

3. The method of claim 2, wherein the torque related quantity is the electromagnetic torque (m), a component of a stator current ($i_{sq}$), a component of a rotor current, a component of a stator flux and/or a component of a rotor flux.

4. The method of claim 1,
wherein the torque related quantity is the electromagnetic torque (m), a component of a stator current ($i_{sq}$), a component of a rotor current, a component of a stator flux and/or a component of a rotor flux.

5. The method of claim 1,
wherein the scanning starts with a maximal or minimal frequency, which is decreased or increased during scanning.

6. The method of claim 1,
wherein the scanning is performed with a scanning stator flux magnitude ($\Psi_{sm}$) lower than a nominal stator flux magnitude ($\Psi_{sm}$) used during normal operation of the induction machine.

7. The method of claim 6, wherein during regulating the slip value (b) to zero, the stator flux magnitude ($\Psi_{sm}$) is controlled to a desired value corresponding to an operating point of the induction machine.

8. A controller for operating an induction machine comprising:
a set of instructions executable by a processor effective to:
scan a state of the induction machine with different stator frequencies ($\omega_s$) by controlling a supply voltage ($V_s$) applied to the induction machine;
during the scanning, determine a torque related quantity (m, $i_{sq}$) from measurements in the induction machine, wherein the torque related quantity (m, $i_{sq}$) is positively correlated with an electromagnetic torque (m) of the induction machine, so that the torque (m) is raising or falling, when the torque related quantity is increased or decreased, respectively;
determine whether a slip value (b), being a difference between a rotor frequency ($\omega_r$) and a stator frequency ($\omega_s$), is within a slip interval based on the torque related quantity (m, $i_{sq}$); and
when it has been determined that the slip value (b) is in the slip interval, regulate the slip value (b) towards zero, wherein the slip value (b) is regulated to zero by regulating a torque related quantity (m, $i_{sq}$) to zero;
wherein it is determined, whether the slip value (b) is within the slip interval, when at least one of:
a derivative of the torque related quantity (m, $i_{sq}$) with respect to the stator frequency ($\omega_s$) is higher than a threshold value;
the torque related quantity (m, $i_{sq}$) becomes smaller than a maximal absolute value of the torque related quantity (m, $i_{sq}$);
a magnitude of an actual stator current becomes smaller than a magnitude of a short circuit stator current corresponding to a stator flux magnitude ($\Psi_{sm}$) used for scanning of the induction machine;
a magnetising component ($i_{sd}$) of an actual stator current becomes smaller than a magnitude of a short circuit stator current corresponding to a stator flux magnitude ($\Psi_{sm}$) used for scanning of the induction machine.

9. A drive system, comprising:
an induction machine,
an electrical converter, and
a controller structured to:
scan a state of the induction machine with different stator frequencies ($\omega_s$) by controlling a supply voltage ($V_s$) applied to the induction machine;
during the scanning, determine a torque related quantity (m, $i_{sq}$) from measurements in the induction machine, wherein the torque related quantity (m, $i_{sq}$) is positively correlated with an electromagnetic torque (m) of the induction machine, so that the torque (m) is raising or falling, when the torque related quantity is increased or decreased, respectively;
determine whether a slip value (b), being a difference between a rotor frequency ($\omega_r$) and a stator frequency ($\omega_s$), is within a slip interval based on the torque related quantity (m, $i_{sq}$); and
when it has been determined that the slip value (b) is in the slip interval, regulate the slip value (b) towards zero, wherein the slip value (b) is regulated to zero by regulating a torque related quantity (m, $i_{sq}$) to zero;
wherein it is determined, whether the slip value (b) is within the slip interval, when at least one of:
a derivative of the torque related quantity (m, $i_{sq}$) with respect to the stator frequency ($\omega_s$) is higher than a threshold value;
the torque related quantity (m, $i_{sq}$) becomes smaller than a maximal absolute value of the torque related quantity (m, $i_{sq}$);
a magnitude of an actual stator current becomes smaller than a magnitude of a short circuit stator current corresponding to a stator flux magnitude ($\Psi_{sm}$) used for scanning of the induction machine;
a magnetising component ($i_{sd}$) of an actual stator current becomes smaller than a magnitude of a short circuit stator current corresponding to a stator flux magnitude ($\Psi_{sm}$) used for scanning of the induction machine.

\* \* \* \* \*